Dec. 5, 1950     C. C. AURAND ET AL     2,532,749
CASTER AND CAMBER CHECKING EQUIPMENT
Filed May 16, 1947     3 Sheets-Sheet 1
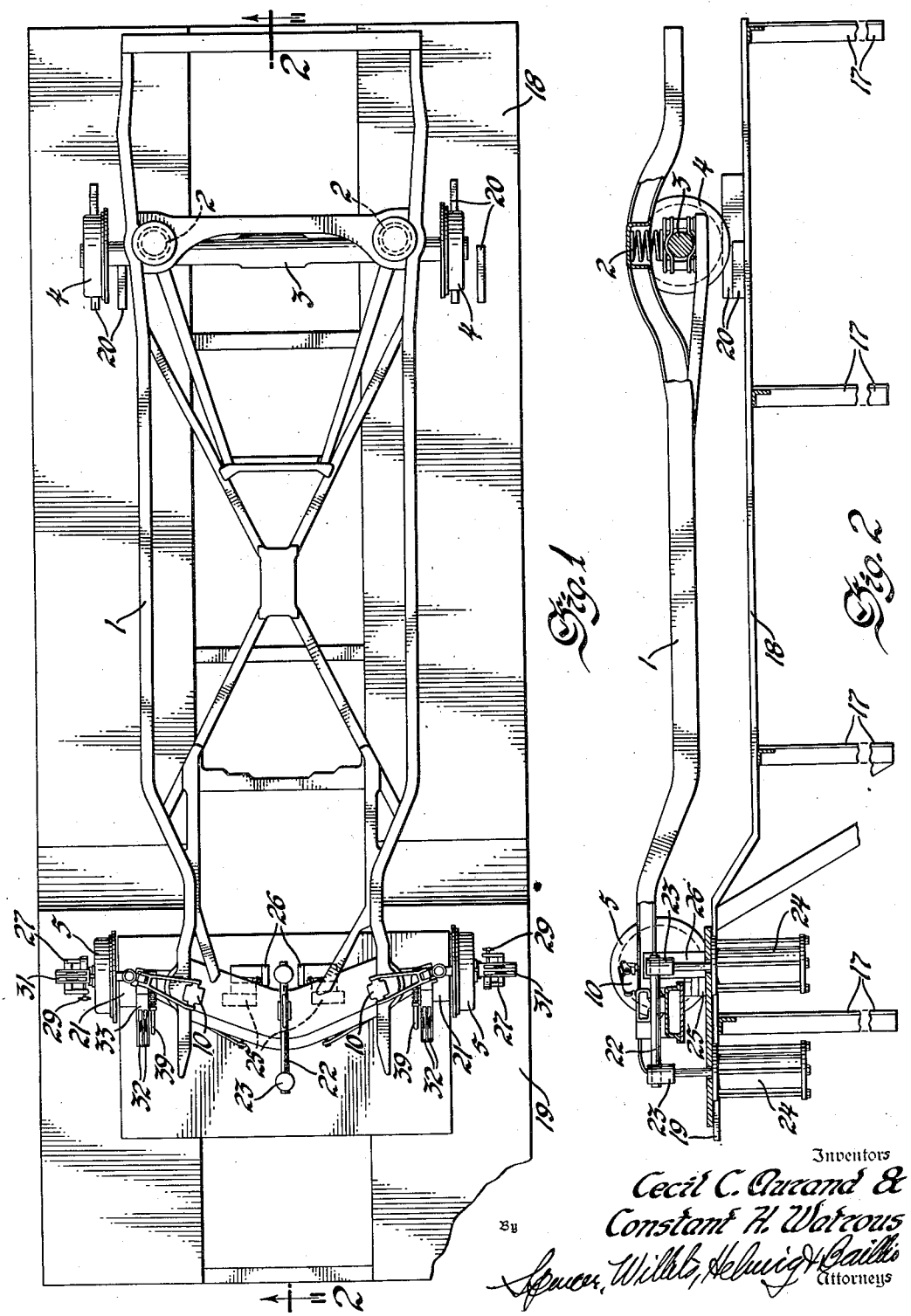

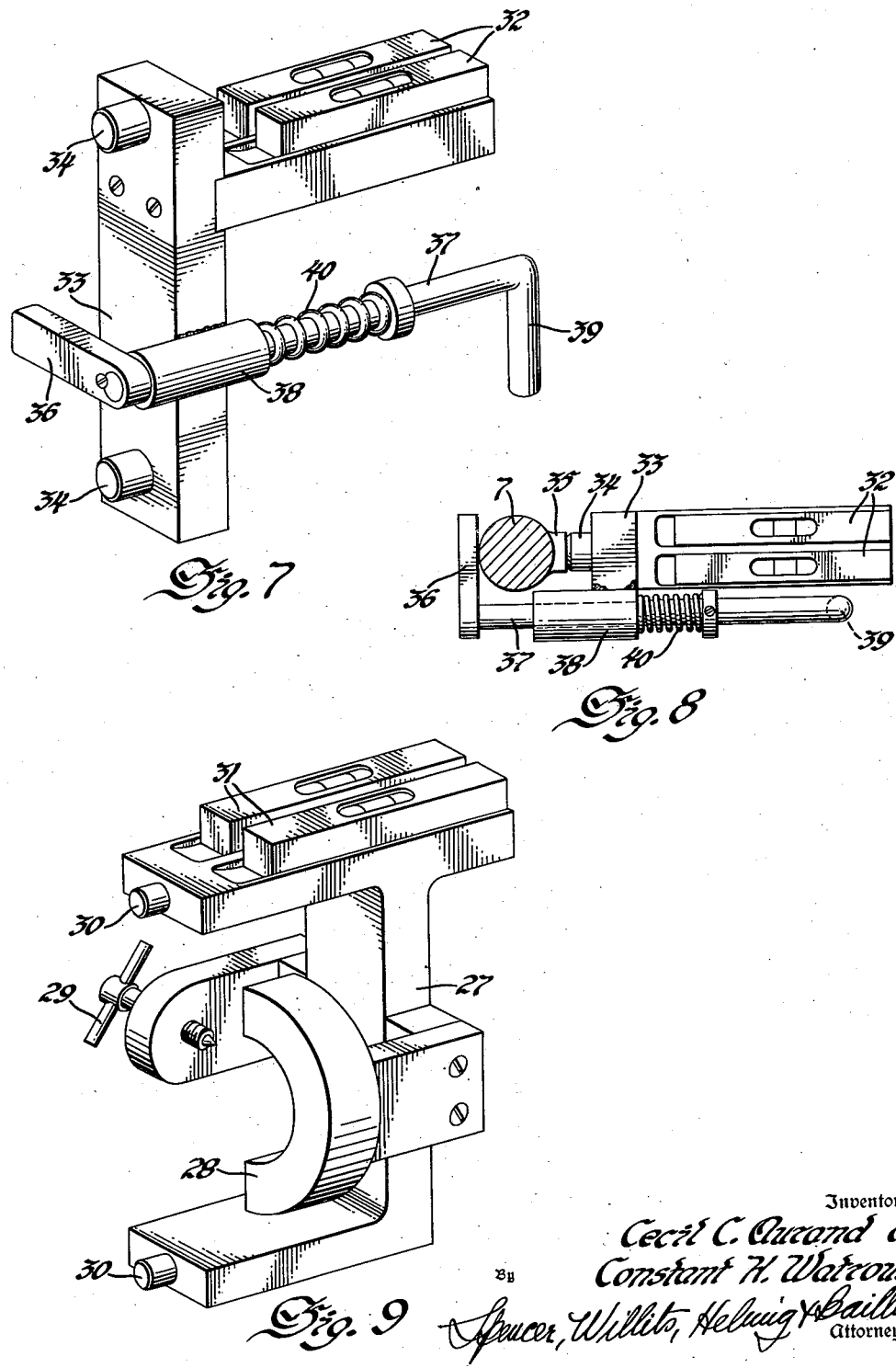

Patented Dec. 5, 1950

2,532,749

UNITED STATES PATENT OFFICE 2,532,749

CASTER AND CAMBER CHECKING EQUIPMENT

Cecil C. Aurand, Cranford, and Constant H. Watrous, North Plainfield, N. J., assignors to General Motors Corporation, Detroit, Mich., a corporation of Delaware Application May 16, 1947, Serial No. 748,418

5 Claims. (Cl. 73—432)

This invention relates to improved factory equipment for use on an automobile assembly line for the setting of front wheel caster and camber.

Heretofore the common practice has been to adjust dirigible wheel setting as a final step in the automobile assembly operation and to specifications established for curb weight. Curb weight has been defined as that of an automobile standing on level ground and complete and ready to be run with full supplies of water, oil and gasoline but without driver and passengers. To enable a more satisfactory adjustment when the parts are easier to get it is here proposed to set wheel caster and camber as early in the assembly stage as possible and with the least man power and a minimum requirement for skill and equipment. This can best be accomplished at the start of the chassis assembly immediately after the springs and axles have been applied to the frame. Accordingly there is contemplated the use of a stationary supporting table for locating the frame, spring and axle assembly at a convenient working height and which is arranged to simulate curb weight conditions. To place the parts in curb weight relation the front suspension springs are compressed by resting the outer ends of the wheel control arms on seating blocks and depressing the front end of the frame against suitable spacer blocks thereby predetermining the extent of spring deflection while the rear of the frame is properly located to insure that the chassis is level fore and aft whereby kingpin inclination may be checked by the application of suitable hand gauges and adjusted to engineering specifications based on curb weight.

Figure 3:
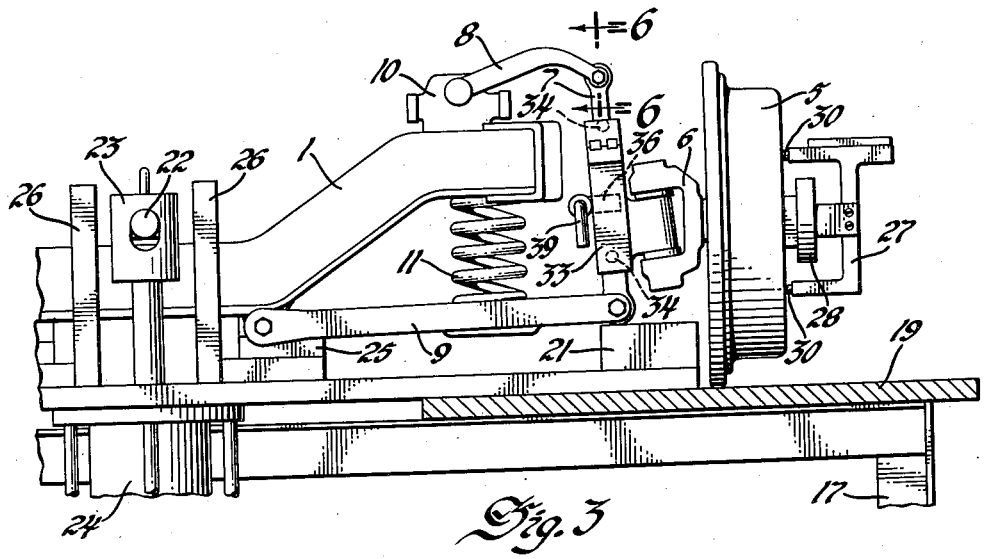
Figure 4:
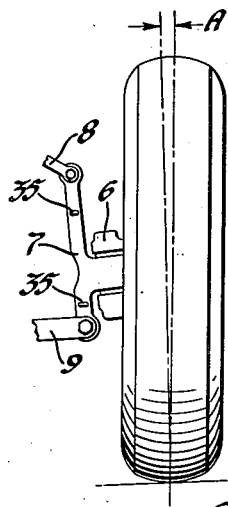
Figure 5:
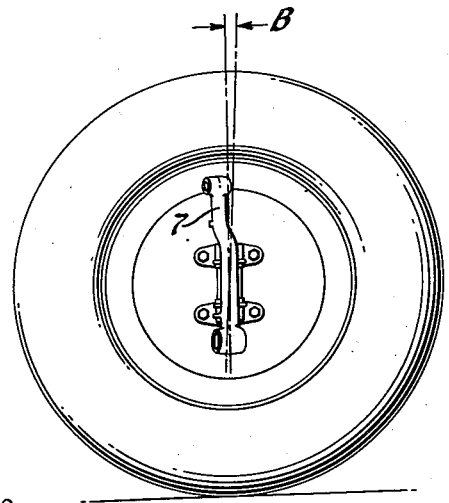
Figure 6:
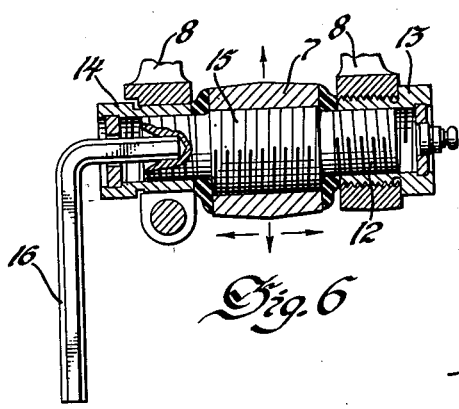

For a better understanding of the invention reference may be made to the accompanying drawing wherein Figure 1 is a top plan view of the worktable with a chassis mounted thereon; Figure 2 is a longitudinal section taken as on line 2—2' of Figure 1; Figure 3 is an enlarged view showing a front wheel suspension system in elevation and a fragment of the worktable partly in section; Figures 4 and 5 are front and side elevations of the wheel assembly and its knuckle support member; Figure 6 is a sectional view illustrating the adjustable connection at the top of the knuckle support through which both camber and caster or vertical inclination of the kingpin is set up; Figure 7 is a perspective view of a hand gauge for checking the caster angle of the kingpin; Figure 8 is a plan view of the gauge shown in Figure 7 and Figure 9 is a perspective view of the hand gauge for checking wheel caster.

In the drawing the frame assembly indicated by the numeral 1 is shown supported at its rear by coil springs 2 upon the drive axle 3 which includes the brake drums 4 prior to the application thereto of the road wheels. Independent wheel suspension mechanism includes the brake drums 5—5, whose hubs are rotatably mounted on stub axles or spindles, each of which terminates in a knuckle or yoke 6 fastened by a kingpin to a knuckle support 7 pivoted at opposite ends to the upper and lower control arms 8 and 9, respectively. At its inner end the lower control arm is pivotally joined to the chassis frame 1 and the inner end of the upper arm 8 likewise is pivoted to the chassis frame by being joined to the rockshaft of a shock absorber unit 10. Interposed between the chassis frame and the lower control arm is the usual load supporting spring 11. The pivotal joint between the knuckle support 7 and the outer end of the upper control arm 8 currently is constructed as shown in the sectional view Figure 6. It includes a pin 12 whose opposite ends are threaded to turn in internal threads in bushings 13 and 14 secured in the forked outer end of the control arm 8, the pin having an enlarged intermediate portion 15 eccentrically related to the threaded ends and carrying threads of opposite hand to the end threads for engagement in the upper eye of the knuckle support 7. Both camber and caster can be adjusted by proper rotation of the pin 12 to change the vertical inclination of the knuckle support and with it the kingpin either fore and aft for setting wheel caster or laterally for setting wheel camber. The adjustments are effected by means of a hand wrench 16 whose rotation through a turn less than 360° will cause the intermediate eccentric portion 15 to move the upper end of the knuckle support 7 inwardly or outwardly to effect the proper camber angle, as indicated by the broken lines in Figure 4, and the angle between them marked A. One or more complete turns of the pin 12 will not disturb camber setting but by reason of the screw thread adjustment will cause a longitudinal travel of the knuckle support 7 relative to the upper control arm 8 and thereby adjust the caster angle, diagrammatically illustrated by the broken lines in Figure 5, whose intervening angle is marked by B.

In the subassembly of the pivot joints the parts will necessarily be put together without careful attention to their final position of exact adjustment and in order that this final adjustment may be made while the parts are still easily accessible the frame, spring and axle assembly are laid upon the worktable, as seen in Figures 1, 2 and 3. This table, which includes a series of supporting legs 17, has vertically offset upper and lower platform portions 18 and 19 for the front and rear of the chassis, respectively. The rear brake drums 4—4 may rest directly on the top of the platform section 18 with the rear springs 2 uncompressed except under the load of the chassis frame. Where the factory is turning out several different types of models and to enable universal use of the table one or more pairs of supporting blocks, indicated generally by the numeral 20, may be mounted on the upper face of the table to be engaged by and to support the rear wheel brake drums 4—4. The support of the rear of the chassis must be predetermined for the particular model so that when the front springs are compressed the chassis frame will be level in the fore and aft direction.

For compressing the front springs a pair of spaced seating blocks 21 are secured on the front platform 19 for engagement by the bottom of the knuckle support 7—7. Optionally the front brake drums could rest directly on the platform 19 but in either event a removable bar 22 is placed on top of the front frame cross member with the opposite ends of the bar hooked into enlarged heads 23 at the upper ends of a pair of plungers cooperating with air cylinders 24—24 by which power may be employed to raise or lower the plungers. The application of power to lower the plungers will depress the frame until the underside of the front frame member seats upon spacer blocks 25 on the top of the worktable thereby compressing the front springs 11 an amount which simulates curb weight loading of the springs. A pair of vertical guides 26 projecting upwardly from the platform 19 are provided to engage the rearward portion of the cross frame member for locating the frame on the worktable.

When the front springs are so compressed the vertical inclination of the kingpin both fore and aft and laterally is ready to be checked. For that purpose the hand gauges shown in Figures 7 and 9, respectively are utilized. The gauge of Figure 9 includes a body 27 having an arcuate seating portion 28 to fit over the wheel hub and to be secured thereon by an adjustable set screw 29 after the end buttons 30—30 carried by the body have been brought into abutment with machine flat faces of the brake drum on opposite sides of the wheel axis and in a vertical plane. The body 27 carries at any suitable place on it and preferably at the top for convenience in reading one or more spirit level gauges 31—31. More than one level gauge 31 will enable the same gauge to be used in checking more than one model of automobile and the respective gauges will be located in preset relation for their selective use. The sight level gauge 31 for the particular model being checked will indicate whether the camber setting needs to be varied to bring it into the proper predetermined relation by means of the eccentric threaded body 15.

A similar set of sight gauges 32 are carried by the detachable block 33 of Figure 7 which has the stop buttons 34—34 to be engaged with lugs 35 formed for the purpose on the knuckle support 7. This gauge is detachably connected to the knuckle support 7 by means of a swinging spring pressed latch 36 mounted on a plunger 37 which is supported in a sleeve 38 welded at the side of the body 33. The plunger 37 terminates in a handle 39 and is surrounded by a coil spring 40 interposed between a collar on the plunger and the supporting sleeve 38 whereby the handle 39 may be depressed and rotated to bring the latch 36 into and out of engagement with the knuckle support 7 in fitting together the abutment buttons 34 and 35. The gauges 32 for selected automobile models will therefore indicate the vertical inclination of the kingpin and the simultaneous use of the two sets of hand gauges during manipulation of the adjusting wrench 16 will permit wheel caster and camber to be easily and conveniently effected.

We claim:

1. In the manufacture of automobiles, apparatus for the setting of front wheel kingpin inclination for correct caster and camber adjustment as soon as front and rear wheel structures are subassembled on the chassis frame and before chassis supported units are completely assembled therewith including means to support the rear of a given chassis frame subassembly at a predetermined height, means to support the front wheel structure at a given height in relation to the first mentioned means so that the frame extends in selected fore and aft level when the front springs are compressed in simulation of curb loading, and mechanism operable to compress the front springs in simulation of curb loading and thereby enable kingpin inclination to be gauged and set to predetermined standards specified for curb loading of a completely assembled automobile.

2. In the manufacture of motor vehicles, the method of setting the kingpin inclination of dirigible wheels during initial stages of final vehicle assembly and prior to the mounting of sprung weight on the chassis, including the placing of the vehicle chassis having attached thereto its dirigible wheels and independently sprung suspension system therefor upon a work platform so arranged that upon compression of the spring suspension system in simulation of curb weight loading the chassis will thereupon be positioned on a fore and aft level corresponding to that of the completely assembled vehicle at curb weight, then compressing the vehicle spring suspension system to a predetermined setting in simulation of curb weight loading, measuring and adjusting the kingpin inclination to the desired angle while the spring suspension is held so compressed and thereafter relieving the compression of the suspension system.

3. Apparatus of the character described for use with a chassis subassembly which includes front and rear wheel structures but excludes chassis supported elements which would constitute vehicle sprung weight, including a chassis receiving platform, means on the platform to support at selected height thereon the rear wheel structure of a chassis, other means to locate the front wheel structure at a height in relation to the first mentioned means that when the front of the chassis is depressed to compress the front spring suspension in simulation of curb weight loading the chassis will be on a level fore and aft corresponding to that at vehicle curb weight, means to depress the forward end of the chassis against the elastic force of the front spring suspension and a stop which limits chassis depression to a position in relation to the front wheel structure conforming to that which exists with the spring suspension system compressed at vehicle curb weight.

4. In the manufacture of automobiles, the method of checking kingpin setting immediately after the front and rear spring suspension and axle subassemblies are mounted on the chassis and before the power plant and other sprung weight elements are assembled on the chassis comprising supporting the front of the chassis with the front wheel axis at a fixed height, supporting the rear of the chassis at a selected height predetermined for the particular chassis model structure so that upon loading of the front spring suspension in simulation of vehicle curb weight loading, the horizontal level of the chassis will correspond to that at vehicle curb weight, applying power to load the front end of the chassis and compress the front spring suspension to an extent simulating curb weight load and then with the chassis so levelized, applying a gauge to a front wheel support for a reading of kingpin inclination.

5. Factory equipment for use in the initial stage of final assembly in the manufacture of motor vehicles and for checking kingpin inclination of dirigible wheels of independent spring suspension systems, a platform for location at the head of a vehicle final assembly line to receive interchangeably any of several different chassis models before sprung weight is added thereto, means at one end of the platform to support the rear wheel structure of a chassis at a selected height as predetermined for the particular chassis model so that each chassis will be at the same fore and aft level when the front of the chassis is depressed to the hereinafter mentioned abutment stop, a support at the opposite end of the platform for the front wheel structure, an abutment stop engageable by the forward end of the chassis to limit deflection of the springs of the independent wheel suspension system and a power device to depress the chassis against the elastic force of the front spring system and into engagement with said abutment stop.

CECIL C. AURAND.
CONSTANT H. WATROUS.

REFERENCES CITED

The following references are of record in the file of this patent:

UNITED STATES PATENTS

| Number | Name | Date |
|---|---|---|
| 1,746,351 | Hem | Feb. 11, 1930 |
| 1,972,285 | Bennett | Sept. 4, 1934 |
| 2,050,721 | McCullough | Aug. 11, 1936 |
| 2,074,108 | Graham | Mar. 16, 1937 |
| 2,317,097 | Eksergian | Apr. 20, 1943 |